US011945249B2

(12) United States Patent
Kawasaki et al.

(10) Patent No.: US 11,945,249 B2
(45) Date of Patent: Apr. 2, 2024

(54) THERMOSENSITIVE RECORDING MEDIUM

(71) Applicant: Nippon Paper Industries Co., Ltd., Tokyo (JP)

(72) Inventors: Kentaro Kawasaki, Tokyo (JP); Yoshimi Midorikawa, Tokyo (JP); Kenji Hirai, Tokyo (JP)

(73) Assignee: NIPPON PAPER INDUSTRIES CO., LTD. (JP)

( * ) Notice: Subject to any disclaimer, the term of this patent is extended or adjusted under 35 U.S.C. 154(b) by 334 days.

(21) Appl. No.: 17/441,059

(22) PCT Filed: Feb. 25, 2020

(86) PCT No.: PCT/JP2020/007308

§ 371 (c)(1),
(2) Date: Sep. 20, 2021

(87) PCT Pub. No.: WO2020/189183

PCT Pub. Date: Sep. 24, 2020

(65) Prior Publication Data

US 2022/0161588 A1 May 26, 2022

(30) Foreign Application Priority Data

Mar. 20, 2019 (JP) ................................ 2019-053003

(51) Int. Cl.
*B41M 5/337* (2006.01)
*B41M 5/323* (2006.01)

(52) U.S. Cl.
CPC .......... *B41M 5/3372* (2013.01); *B41M 5/323* (2013.01); *B41M 2205/04* (2013.01)

(58) Field of Classification Search
CPC . B41M 5/323; B41M 5/3372; B41M 2205/04
See application file for complete search history.

(56) References Cited

U.S. PATENT DOCUMENTS

| | | | |
|---|---|---|---|
| 2009/0258784 A1 | 10/2009 | Etoh et al. | |
| 2011/0105319 A1 | 5/2011 | Hirai et al. | |
| 2012/0038737 A1 | 2/2012 | Hirai et al. | |

FOREIGN PATENT DOCUMENTS

| | | | |
|---|---|---|---|
| EP | 2 184 175 A1 | 5/2010 | |
| JP | H11-314454 A | 11/1999 | |
| JP | 2009-051049 A | 3/2009 | |
| JP | 2010-111037 A | 5/2010 | |
| JP | 2010-115834 A | 5/2010 | |
| JP | 2015 080852 A | 4/2015 | |
| JP | 2015123702 A | 7/2015 | |
| WO | WO 2007/049621 A1 | 5/2007 | |
| WO | WO 2008/139948 A1 | 11/2008 | |
| WO | WO 2010/110209 A1 | 9/2010 | |
| WO | WO 2011/145545 A1 | 11/2011 | |

OTHER PUBLICATIONS

Supplementary European Search Repport corresponding to EP application No. EP 20774130 dated Feb. 18, 2022.
International Preliminary Report on Patentability corresponding to International application No. PCT/JP2020/007308 dated Sep. 30, 2021 English translation.
International Search Report corresponding to International application No. PCT/JP2020/007308 dated Apr. 20, 2020 English translation.
Written Opinion corresponding to International application No. PCT/JP2020/007308 dated Sep. 30, 2021 English translation.

*Primary Examiner* — Gerard Higgins
(74) *Attorney, Agent, or Firm* — Harness, Dickey & Pierce, P.L.C.

(57) ABSTRACT

The present invention provides a thermosensitive recording medium having a high degree of water resistance and excellent surface qualities. The thermosensitive recording medium has a thermosensitive recording layer comprising a colorless or pale colored basic leuco dye and an electron accepting developing agent on a substrate, but does not have a protective layer on the thermosensitive recording layer, and the thermosensitive recording layer further comprises (i) a carboxy-modified polyvinyl alcohol as a binder, (ii) an epichlorohydrin resin and a modified polyamine/amide resin (excluding those contained in the category of epichlorohydrin resin) as crosslinking agents, and (iii) an acrylic resin with a glass transition temperature (Tg) of lower than or equal to 50 degree C. and a minimum film forming temperature (MFT) of higher than or equal to 40 degree C.

19 Claims, 1 Drawing Sheet

(A)
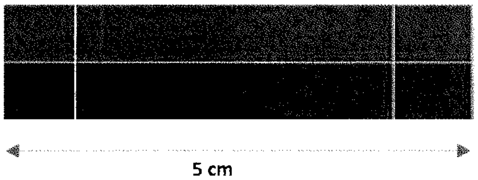
5 cm
(B)
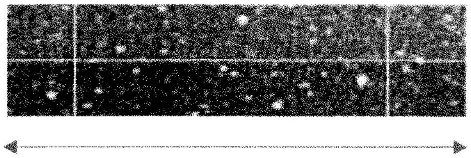
5 cm

THERMOSENSITIVE RECORDING MEDIUM

FIELD OF THE INVENTION

The present invention relates to a thermosensitive recording medium having a high degree of water resistance and excellent surface qualities.

BACKGROUND OF THE INVENTION

A thermosensitive recording medium having a thermosensitive recording layer comprising a colorless or pale colored basic leuco dye (henceforth referred also to as “leuco dye”) and an electron accepting developing agent (henceforth referred also to as “color developing agent”) is being widely used. In general, a thermal printer equipped with a thermal head is used to record on the thermosensitive recording medium. This recording method has many advantages, such as low noise when printing, no need for development fixing, maintenance free, inexpensive, compact in size, clear color development, etc., therefore is used extensively in facsimiles, printers of computers, automatic ticket vending machines, measurement recorders, handy terminals and the like.

With the expansion of such applications, in recent years, a higher surface quality (also called surface feeling) is required to have as basic performance of the quality of thermosensitive recording medium. And further, in such applications as labels, tickets, handy terminal paper, delivery slips, etc. which are often used in outdoors, a high degree of water resistance, for example, water resistance that can withstand rough handling during rainfall, is being required.

In order to improve durability such as water resistance, it has been conducted to install a protective layer on the thermosensitive recording layer, which contains various kinds of acrylic resins (References 1 to 3, etc.). However, when installing a protective layer on the thermosensitive recording layer, the color development performance of the thermosensitive recording medium is usually deteriorated.

On the other hand, in order to improve the water resistance and the like without deteriorating the color development performance of the thermosensitive recording medium, it is known to contain a carboxyl group-containing resin, an epichlorohydrin resin and a modified polyamine/amide resin in the thermosensitive recording layer without installing a protective layer (References 4 and 5).

Reference 1: Japanese Patent Application Public Disclosure H11-314454

Reference 2: International Publication WO2007/049621

Reference 3: International Publication WO2010/110209

Reference 4: International Publication WO2008/139948

Reference 5: Japanese Patent Application Public Disclosure 2010-111037

Problems to be Solved by the Invention

Therefore, the object of the present invention is to provide a thermosensitive recording medium having a high degree of water resistance and excellent surface qualities without installing a protective layer.

Means to Solve the Problems

In order to solve the above problems, in addition to containing a carboxyl group-containing resin, an epichlorohydrin resin, and a modified polyamine/amide resin in the thermosensitive recording layer (References 4 and 5), the inventors examined various acrylic resins to use in combination with these resins. As a result, the inventors found that the above mentioned problems can be solved without installing a protective layer by having a thermosensitive recording layer comprising an acrylic resin with a glass transition temperature (Tg) of lower than or equal to 50 degree C. and a minimum film forming temperature (MFT) of higher than or equal to 40 degree C., in addition to a carboxyl group-containing resin, an epichlorohydrin resin and a modified polyamine/amide resin, then completed the present invention.

That is, the present invention provides a thermosensitive recording medium having a thermosensitive recording layer comprising a colorless or pale colored basic leuco dye and an electron accepting developing agent on a substrate, but not having a protective layer on the thermosensitive recording layer, wherein the thermosensitive recording layer further comprises (i) a carboxy-modified polyvinyl alcohol as a binder, (ii) an epichlorohydrin resin and a modified polyamine/amide resin (excluding those contained in the category of epichlorohydrin resin) as crosslinking agents, and (iii) an acrylic resin with a glass transition temperature (Tg) of lower than or equal to 50 degree C. and a minimum film forming temperature (MFT) of higher than or equal to 40 degree C.

BRIEF DESCRIPTION OF THE DRAWINGS

FIG. 1 shows the photographs of the solidly printed surface of the thermosensitive recording medium. FIG. 1 (A) shows the printed surface according to Example 1 and FIG. 1 (B) shows the printed surface according to Comparative Example 3.

DETAILED DESCRIPTION OF THE INVENTION

The thermosensitive recording medium of the present invention essentially comprises a thermosensitive recording layer on the substrate, and does not have a protective layer on the thermosensitive recording layer. The thermosensitive recording medium may optionally have an undercoat layer between the substrate and the thermal recording layer, and also may optionally have a backcoat layer on the surface of the substrate opposite to the thermal recording layer. Any other coating layer may be appropriately installed between these layers depending on the purpose of use.

The substrate is not particularly limited, and can be appropriately selected from conventionally known substrates such as paper, recycled paper, synthetic paper, film, plastic film, foamed plastic film, nonwoven fabric or the like according to the desired quality of the thermosensitive recording medium. Further, any combination of these may be used as a substrate.

The thermosensitive recording layer of the present invention contains a carboxy-modified polyvinyl alcohol as a binder, an epichlorohydrin resin and a modified polyamine/amide resin (excluding those contained in the category of epichlorohydrin resin) as crosslinking agents, and further contains a specific acrylic resin.

The glass transition point (Tg) of the acrylic resin is 50 degree C. or lower, preferably 40 to 50 degree C. The glass transition temperature (Tg) is calculated for each element (monomer) constituting the resin, using the change in specific heat associated with the secondary transition as the glass transition temperature, which is measured with a scanning differential calorimeter (10 mg sample heated by raising the temperature at 25 degree C./min) under a nitrogen atmosphere based on Japanese Industrial Standards (JIS) K-7122, which is obtained from the following formula:

Glass transition temperature (Tg) of the resin=Tg1×a1+Tg2×a2+ . . . +Tgn x an (wherein, Tg1, Tg2, . . . Tgn: measured glass transition temperature of each element; a1, a2 . . . an: weight fraction (%) of each element in total resin weight)

On the other hand, the minimum film forming temperature (MFT) of the acrylic resin is 40 degree C. or higher, preferably 50 degree C. or higher, and more preferably 60 to 80 degree C. This minimum film thickening temperature (MFT) is the minimum temperature such that, when the resin adjusted to 20% by weight is spread over the entire surface of the slide glass, dried at a predetermined temperature, and dried, the resin forms a uniform and continuous film, which is not cloudy, according to JIS K-6828. Examples of such an acrylic resin include A537 (manufactured by Johnson Polymer Co., Ltd., Tg: 49 degree C., MFT: 42 degree C.) and A25 (manufactured by Aica Kogyo Co., Ltd., Tg: 47 degree C., MFT: 70 degree C.).

The acrylic resin for use in the present invention can be synthesized by polymerizing an unsaturated group-containing polymerizable monomer, which includes, for example, unsaturated carboxylic acids such as acrylic acid, methacrylic acid, maleic acid, fumaric acid, itaconic acid, and their monoesters, vinyl esters such as vinyl acetate etc., and vinyl ethers such as methyl vinyl ether, ethyl vinyl ether and butyl vinyl ether etc., all of which contains a methyl methacrylate (MMA) monomer. The content of methyl methacrylate (MMA) is preferably 50% or more, more preferably 60% or more.

Examples of such an acrylic resin include A25 (manufactured by Aica Kogyo Co., Ltd., content of MMA: 60% or more) and the like.

Further, the acrylic resin for use in the present invention preferably does not contain styrene as a monomer, and is preferably a non-core shell type acrylic resin. Examples of such an acrylic resin include A25 (manufactured by Aica Kogyo Co., Ltd.) and the like.

The carboxy modified poly(vinyl alcohol) for use in the present invention may be obtained in the form of a reaction product of poly(vinyl alcohol) and a polyvalent carboxylic acid such as fumaric acid, phthalic anhydride, mellitic anhydride, itaconic anhydride and the like or as esterified materials of these reaction products or, furthermore, in the form of saponified materials of the copolymers of vinyl acetate with an ethylenic unsaturated dicarboxylic acid such as maleic acid, fumaric acid, itaconic acid, crotonic acid, acrylic acid, methacrylic acid and the like. More specifically, the production processes listed as examples in Example 1 or Example 4 in, for example, Japanese Patent Application Public Disclosure S53-91995 may be cited. In addition, a degree of saponification of from 72 to 100 mole % is preferred for the carboxyl modified poly(vinyl alcohol). A degree of polymerization is preferably from 500 to 2400, more preferably 1000 to 2000.

The thermosensitive recording layer of the present invention may comprise binders other than carboxy-modified polyvinyl alcohol in addition to the carboxy-modified polyvinyl alcohol to the extent that the binder does not interfere with the desired performance. Such binder includes, completely saponified polyvinyl alcohol, partially saponified polyvinyl alcohol, diacetone modified polyvinyl alcohol, acetoacetyl modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrolidone-modified polyvinyl alcohol, silicone-modified polyvinyl alcohol, silanol-modified polyvinyl alcohol, cation-modified polyvinyl alcohol, terminal alkyl-modified polyvinyl alcohol and the like; cellulose ethers and derivatives thereof such as hydroxyethyl cellulose, methyl cellulose, ethyl cellulose, carboxymethyl cellulose, acetyl cellulose and the like; starch such as starch, enzyme modified starch, thermochemically modified starch, oxidized starch, esterified starch, etherified starch (for example, such as hydroxyethyl starch), cationic starch and the like; polyacrylamides such as polyacrylamide, cationic polyacrylamides, anionic polyacrylamides, amphoteric polyacrylamides and the like; urethane resins such as polyester polyurethane resins, polyether polyurethane resins, polyurethane-based ionomer resin and the like; styrene-butadiene resins such as styrene-butadiene copolymer, styrene-butadiene-acrylonitrile copolymer, styrene-butadiene-acrylic copolymer and the like; polyvinyl acetate; vinyl chloride-vinyl acetate copolymer; polyolefin resin such as ethylene-vinyl acetate copolymer; polyvinyl chloride; polyvinylidene chloride; polyacrylic ester resin; gum arabic, polyvinyl butylal, polystyrol and their copolymers; silicone resins; petroleum resins; terpene resins; ketone resins; cumaron resins and the like may be listed as examples. These may be used individually or as mixtures of at least two of them.

The total amount of the binder of the thermosensitive recording layer of the present invention is preferably that of carboxy-modified polyvinyl alcohol. When binders other than carboxy-modified polyvinyl alcohol are used in combination, the amount of the binders is preferably 40% by weight or less, more preferably 30% by weight or less, with respect to the total amount of binder.

The epichlorohydrin resin for use in the present invention is a resin characterized by containing an epoxy group in the molecule, and examples thereof include, poly(amide epichlorohydrin) resins, poly(amine epichlorohydrin) resins and the like and these can be used individually or in combinations. In addition, primary to quaternary amines may be used as the amine that is present in the main chain of an epichlorohydrin resin, and no particular restrictions apply. Furthermore, a degree of cationization of no greater than 5 meq/g solid (measured at pH 7) and a molecular weight of at least 500,000 are preferred from the view point of good water resistance. Sumirez Resin 650 (30), Sumirez Resin 675A, Sumirez Resin 6615 (the above, Sumitomo Chemical Co., Ltd.), WS4002, WS 4020, WS4024, WS4030, WS4046, WS4010, CP8970 (the above, Seiko PMC Corporation) may be cited as specific examples.

The modified polyamine/amide resin for use in the present invention means a modified polyamine resin and/or a modified polyamide resin, and does not include those contained in the category of above epichlorohydrin resin. Examples of such modified polyamine/amide resin include polyamide urea resins, polyalkylene polyamine resins, polyalkylene polyamide resins, polyamine polyurea resins, modified polyamine resins, modified polyamide resins, polyalkylene polyamine urea formalin resins, and polyalkylene polyamine polyamide polyurea resins. These may be used individually or as mixtures of at least two of them. Specific examples include Sumirez resin 302 (polyamine polyurea resin produced by Sumitomo Chemical Co., Ltd.), Sumirez resin 712 (polyamine polyurea resin produced by Sumitomo Chemical Co., Ltd.), Sumirez resin 703 (polyamine polyurea resin produced by Sumitomo Chemical Co., Ltd.), Sumirez resin 636 (polyamine polyurea resin produced by Sumitomo Chemical Co., Ltd.), Sumirez resin SPI-100 (modified polyamine resin produced by Sumitomo Chemical Co., Ltd.), Sumirez resin SPI-102A (modified polyamine resin produced by Sumitomo Chemical Co., Ltd.), Sumirez resin SPI-106N (modified polyamide resin produced by Sumitomo Chemical Co., Ltd.), Sumirez resin SPI-203(50)(Sumitomo Chemical Co., Ltd.), Sumirez resin SPI-198 (Sumitomo Chemical Co., Ltd.), PrintiveA-700 (Asahi Kasei Corporation), PrintiveA-600 (Asahi Kasei Corporation), PA6500, PA6504, PA6634, PA6638, PA6640, PA6644, PS6646, PA6654, PA6702, PA 6704 (the above, polyalkylene polyamine polyamide polyurea resins produced by Seiko PMC Corporation), and these can be used solely or in combinations of two kinds or more. From the viewpoint of recording sensitivity, polyamine resins (polyalkylene polyamine resins, polyamine polyurea resins, modified polyamine resins, polyalkylene polyamine urea formalin resins, and polyalkylene polyamine polyamide polyurea resins) are preferable.

The thermosensitive recording layer of the present invention essentially contains a leuco dye and a color developing agent in addition to the above binder and crosslinking agent and the above acrylic resin, and may optionally contain crosslinking agent other than the above-mentioned crosslinking agent, sensitizer, pigment, image stabilizer, and any other agents.

As the leuco dye in the present invention, all of the leuco dyes well known in the conventional field of pressure sensitive and thermosensitive recording media may be used. As the leuco dye is not particularly restricted, triphenylmethane type compounds, fluorane type compounds, fluorene type compounds, divinyl type compounds and the like are preferred as the leuco dye. Specific examples of the typical leuco dye (dye precursors) are shown below. In addition, these leuco dye precursors may be used individually and also in mixtures of at least two of them.

Triphenylmethane Type Leuco Dyes 3,3-bis(p-Dimethyl aminophenyl)-6-dimethylaminophthalide [alternate name: crystal violet lactone] and 3,3-bis (p-Dimethyl aminophenyl) phthalide [alternate name: malachite green lactone]

Fluorane Type Leuco Dyes

3-Diethylamino-6-methylfluorane, 3-diethylamino-6-methyl-7-anilinofluorane, 3-diethylamino-6-methyl-7-(o,p-dimethylanilino)fluorane, 3-diethylamino-6-methyl-7-chlorofluoran, 3-diethylamino-6-methyl-7-(m-trifluoromethylanilino) fluorane, 3-diethylamino-6-methyl-7-(o-chloroanilino) fluorane, 3-diethylamino-6-methyl-7-(p-chloroanilino) fluorane, 3-diethylamino-6-methyl-7-(o-fluoroanilino) fluorane, 3-diethylamino-6-methyl-7-(m-methylanilino) fluorane, 3-diethylamino-6-methyl-7-n-octylanilino fluorane, 3-diethylamino-6-methyl-7-n-octylamino fluorane, 3-diethylamino-6-methyl-7-benzylamino fluorane, 3-diethylamino-6-methyl-7-dibenzylamino fluorane, 3-diethylamino-6-chloro-7-methyl fluorane, 3-diethylamino-6-chloro-7-anilino fluorane, 3-diethylamino-6-chloro-7-p-methylanilino fluorane, 3-diethylamino-6-ethoxyethyl-7-anilino fluorane, 3-diethylamino-7-methyl fluorane, 3-diethylamino-7-chloro fluorane, 3-diethylamino-7-(m-trifluoromethylanilino) fluorane, 3-diethylamino-7-(o-chloroanilino) fluorane, 3-diethylamino-7-(p-chloroanilino) fluorane, 3-diethylamino-7-(o-fluoroanilino) fluorane, 3-diethylamino-benz[a] fluorane, 3-diethylamino-benz[c] fluorane, 3-dibutylamino-6-methyl-fluorane, 3-dibutylamino-6-methyl-7-anilino fluorane, 3-dibutylamino-6-methyl-7-(o,p-dimethylanilino) fluorane, 3-dibutylamino-7-(o-chloroanilino) fluorane, 3-butylamino-6-methyl-7-(p-chloroanilino) fluorane, 3-dibutylamino-6-methyl-7-(o-fluoroanilino) fluorane, 3-dibutylamino-6-methyl-7-(m-fluoroanilino) fluorane, 3-dibutylamino-6-methyl-chloro fluorane, 3-dibutylamino-6-ethoxyethyl-7-anilino fluorane, 3-dibutylamino-6-chloro-7-anilino fluorane, 3-dibutylamino-6-methyl-7-p-methylanilino fluorane, 3-dibutylamino-7-(o-chloroanilino) fluorane, 3-dibutylamino-7-(o-fluoroanilino) fluorane, 3-di-n-pentylamino-6-methyl-7-anilino fluorane, 3-di-n-pentylamino-6-methyl-7-(p-chloroanilino) fluorane, 3-di-n-pentylamino-7-(m-trifluoromethylanilino) fluorane, 3-di-n-pentylamino-6-chloro-7-anilino fluorane, 3-di-n-pentylamino-7-(p-chloroanilino) fluorane, 3-pyrolidino-6-methyl-7-anilino fluorane, 3-piperidino-6-methyl-7-anilino fluorane, 3-(N-methyl-N-propylamino)-6-methyl-7-anilino fluorane, 3-(N-methyl-N-cyclohexylamino)-6-methyl-7-anilino fluorane, 3-(N-ethyl-N-cyclohexylamino)-6-methyl-7-anilino fluorane, 3-(N-ethyl-N-xylylamino)-6-methyl-7-(p-chloroanilino) fluorane, 3-(N-ethyl-p-toluidino)-6-methyl-7-anilino fluorane, 3-(N-ethyl-N-isoamylamino)-6-methyl-7-anilino fluorane, 3-(N-ethyl-N-isoamylamino)-6-chloro-7-anilino fluorane, 3-(N-ethyl-N-tetrahydrofurfurylamino)-6-methyl-7-anilino fluorane, 3-(N-ethyl-N-isobutylamino)-6-methyl-7-anilino fluorane, 3-(N-ethyl-N-ethoxypropylamino)-6-methyl-7-anilino fluorane, 3-cyclohexylamino-6-chloro fluorane, 2-(4-oxahexyl)-3-dimethylamino-6-methyl-7-anilino fluorane, 2-(4-oxahexyl)-3-diethylamino-6-methyl-7-anilino fluorane, 2-(4-oxahexyl)-3-dipropylamino-6-methyl-7-anilino fluorane, 2-methyl-6-o-(p-dimethylaminophenyl) aminoanilino fluorane, 2-methoxy-6-p-(p-dimethylaminophenyl) aminoanilino fluorane, 2-chloro-3-methyl-6-p-(p-phenylaminophenyl) aminoanilino fluorane, 2-chloro-6-p-(p-dimethylaminophenyl) aminoanilino fluorane, 2-nitro-6-p-(p-diethylaminophenyl) aminoanilino fluorane, 2-amino-6-p-(p-diethylaminophenyl) aminoanilino fluorane, 2-diethylamino-6-p-(p-diethylaminophenyl) aminoanilino fluorane, 2-phenyl-6-methyl-6-p-(p-phenylaminophenyl) aminoanilino fluorane, 2-benzyl-6-p-(p-phenylaminophenyl) aminoanilino fluorane, 2-hydroxy-6-p-(p-phenylaminophenyl)aminoanilino fluorane, 3-methyl-6-p-(p-dimethylaminophenyl) aminoanilino fluorane, 3-diethylamino-6-p-(p-diethylaminophenyl) aminoanilino fluorane, 3-diethylamino-6-p-(p-dibutylaminophenyl) aminoanilino fluorane and 2,4-dimethyl-6-[(4-dimethylamino) anilino] fluorane.

Fluorene Type Leuco Dye 3,6,6-Tris(dimethylamino) spiro[fluorane-9,3'-phthalide] and 3,6,6'-tris (diethylamino) spiro[fluorane-9,3'-phthalide].

Divinyl Type Leuco Dyes 3,3-bis-[2-(p-dimethylaminophenyl)-2-(p-methoxyphenyl) ethenyl]-4,5,6,7-tetrabromophthalide, 3,3-bis-[2-(p-dimethylaminophenyl)-2-(p-methoxyphenyl) ethenyl]-4,5,6,7-tetrachlorophthalide, 3,3-bis-[1,1-bis(4-pyrrolidinophenyl) ethylene-2-yl] 4,5,6,7-tetrabromophthalide, 3,3-bis-[1-(4-methoxyphenyl)-1-(4-pyrrolidinophenyl) ethylene-2-yl]-4,5,6,7-tetrachlorophthalide Others 3-(4-Diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide, 3-(4-cyclohexyl ethylamino-2-methoxyphenyl)-3-(1-ethyl-2-methylindol-3-yl)-4-azaphthalide, 3,3-bis(1-ethyl-2-methylindol-3-yl)phthalide, 3,6-bis(diethylamino)fluorane-γ-(3'-nitroanilinolactam, 3,6-bis(diethylamino)fluorane-γ-(4'-nitro) anilinolactam, 1,1-bis-[2',2',2",2"-tetrakis-(p-dimethylaminophenyl)-ethenyl]-2,2-dinitrilethane, 1,1-bis-[2',2',2",2"-tetrakis-(p-dimethylaminophenyl)-ethenyl]-2-β-naphthoylethane, 1,1-bis-[2',2',2",2"-tetrakis-(p-dimethylaminophenyl)-ethenyl]-2,2-diacetylethane and bis-[2,2,2',2'-tetrakis-(p-dimethylaminophenyl)-ethenyl]-methylmalonic acid dimethyl ester.

The color development agents well known in the conventional field of pressure sensitive and thermosensitive recording media may be used as the color development agent in a thermosensitive recording material of the present invention. Although the color development agent is not particularly restricted, the color development agents include activated clay, attapulgite, colloidal silica, inorganic acidic substances such as aluminum silicate and the like, 4,4'-isopropylidene diphenol, 1,1-bis(4-hydroxyphenyl) cyclohexane, 2,2-bis(4-hydroxyphenyl)-4-methylpentane, 4,4'-dihydroxydiphenyl sulfide, hydroquinone monobenzyl ether, benzyl 4-hydroxybenzoate, 4,4'-dihydroxy diphenyl sulfone, 2,4'-dihydroxy diphenyl sulfone, 4-hydroxy-4'-isopropxy diphenyl sulfone, 4-hydroxy-4'-n-propoxy diphenyl sulfone, bis(3-allyl-4-hydroxyphenyl) sulfone, 4-hydroxy-4'-methyl diphenyl sulfone, 4-hydroxyphenyl-4'-benzyloxyphenyl sulfone, 3,4-dihydroxyphenyl-4'-methyl phenyl sulfone, 1-[4-(4-hydroxyphenyl-sulfonyl) phenoxy]-4-[4-(4-isopropoxyphenyl sulfonyl) phenoxy] butane, phenol condensate composition described in Japanese Patent Application Public Disclosure No. 2003-154760, aminobenzene sulfonamide derivatives described in Japanese Patent Application Public Disclosure No. H08-59603, bis(4-hydroxyphenyl thioethoxy) methane, 1,5-di(4-hydroxyphenyl thio)-3-oxapentane, butyl bis(p-hydroxyphenyl) acetate, methyl bis(p-hydroxyphenyl) acetate, 1,1-bis(4-hydroxyphenyl)-1-phenyl ethane, 1,4-bis[α-methyl-α-(4'-hydroxyphenyl)ethyl] benzene, 1,3-bis[α-methyl-α-(4'-hydroxyphenyl)ethyl] benzene, di(4-hydroxy-3-methylphenyl) sulfide, 2,2'-thiobis(3-tert-octylphenol), 2,2'-thiobis(4-tert-octylphenol), phenolic compounds such as diphenyl sulfone crosslinked compounds and the like described in International Publication WO97/16420, phenolic compounds described in International Publication WO02/081229 or Japanese Patent Application Public Disclosure No. 2002-301873, thiourea compounds such as N,N'-di-m-chlorophenyl thiourea and the like, p-chlorobenzoic acid, stearyl gallate, bis[zinc 4-octyloxy carbonylamino] salicylate dihydrate, 4-[2-(p-methoxyphenoxy) ethyloxy] salicylic acid, 4-[3-(p-trisulfonyl) propyloxy] salicylic acid, aromatic carboxylic acids such as 5-[p-(2-p-methoxyphenoxyethoxy) cumyl] salicylic acid and salts of these aromatic carboxylic acids and polyvalent metals such as zinc, magnesium, aluminum, calcium, titanium, manganese, tin, nickel and the like, and, furthermore, antipirin complexes of zinc thiocyanate and complex zinc salts and the like of terephthal aldehyde acid with other aromatic carboxylic acids. These color developing agents may be used individually and in mixtures of at least two. 1-[4-(4-hydroxyphenyl-sulfonyl) phenoxy]-4-[4-(4-isopropoxyphenyl sulfonyl) phenoxy] butane is available under the trade name of TOMILAC214 produced by Mitsubishi Chemical Corporation. The phenol condensate composition described in Japanese Patent Application Public Disclosure No. 2003-154760 is available under the trade name of TOMILAC224 produced by Mitsubishi Chemical Corporation. The diphenylsulfone crosslinked type compound described in International Publication WO97/16420 is available under the trade name of D-90 produced by Nippon Soda Co., Ltd. The compound described in International Publication WO02/081229 is also available under the trade names of NKK-395 and D-100 produced by Nippon Soda Co., Ltd.

The sensitizers well known in the conventional field may be used as the sensitizer for use in the the present invention. As such sensitizers, aliphatic acid amides such as stearic acid amide, palmitic acid amide and the like, ethylene bis-amide, montan acid wax, polyethylene wax, 1,2-di-(3-methylphenoxy) ethane, p-benzyl biphenyl, β-benzyloxy naphthalene, 4-biphenyl-p-tolyl ether, m-terphenyl, 1,2-diphenoxyethane, dibenzyl oxalate, di(p-chlorobenzyl) oxalate, di(p-methylbenzyl) oxalate, dibenzyl terephthalate, benzyl p-benzyloxy benzoate, di-p-tolyl carbonate, phenyl-□-naphthyl carbonate, 1,4-diethoxynaphthalene, 1-hydroxy-2-naphthoic acid phenyl ester, o-xylene-bis-(phenyl ether), 4-(m-methyl phenoxymethyl) biphenyl, 4,4'-ethylene dioxy-bis-benzoic acid dibenzyl ester, dibenzoyloxy methane, 1,2-di(3-methylphenoxy) ethylene, bis[2-(4-methoxyphenoxy) ethyl] ether, methyl p-nitrobenzoate, phenyl p-toluene sulfonate, and the like may be listed as examples, but the sensitizer is not limited to those. These sensitizers may be used individually and as mixtures of at least two of them.

As a pigment used in the present invention, inorganic or organic fillers such as silica, calcium carbonate, kaolin, calcined kaolin, diatomaceous earth, talc, titanium oxide, aluminum hydroxide and the like may be cited. These may be used individually or as mixtures of at least two of them.

As the crosslinking agent other than the above-mentioned crosslinking agent used in the present invention, glyoxal, methylol melamine, melamine formaldehyde resins, melamine urea resins, potassium persulfate, ammonium persulfate, sodium persulfate, ferric chloride, magnesium chloride, borate sand, boric acid, alum, ammonium chloride and the like may be listed as examples.

In addition, an image stabilizing agent that instills oil resistance in recorded images such as 4,4'-butylidene (6-t-butyl-3-methylphenol), 2,2'-di-t-butyl-5,5'-dimethyl-4,4'-sulfonyl diphenol, 1,1,3-tris (2-methyl-4-hydroxy-5-cyclohexylphenyl) butane, 1,1,3-tris (2-methyl-4-hydroxy-5-t-butylphenyl) butane, 4-benzyloxy-4'-(2,3-epoxy-2-methylpropoxy) diphenylsulfone and the like may also be added in the range that does not adversely affect the desired effects for the problems described above.

In addition, a benzophenone type and triazole type UV light absorption agent, dispersion agent, de-foaming agent, antioxidant, fluorescent dye and the like may also be used.

The types and amounts of leuco dye, color developing agent, and other various ingredients used in the thermosensitive recording medium of the present invention may be determined according to the required performance and printability, and are not particularly limited. From 0.5 parts to 10 parts of the color developing agent, and from 0.1 parts to 10 parts of the sensitizer are ordinarily used per 1 part of the leuco dye.

The types and amounts of other optional components such as binders, pigments, lubricants, crosslinking agents, image stabilizers, and other components are determined according to the required performance and recordability, and are not particularly limited. About 5 to 50 parts by weight in terms of solid content of the binder is ordinarily used per 100 parts by weight of the thermosensitive recording layer (solid content), and about 0 to 50 parts by weight in terms of solid content of the pigment is ordinarily used per 100 parts by weight of the thermosensitive recording layer (solid content). When a lubricant is used, the solid content of the lubricant is preferably about 5 to 10 parts by weight with respect to 100 parts by weight of the thermal recording layer (solid content).

The total amount of the carboxy-modified polyvinyl alcohol and the acrylic resin used in the present invention is about 1 to 50 parts by weight, preferably 3 to 40 parts by weight, more preferably 4 to 20 parts by weight per 100 parts by weight of the thermosensitive recording layer (solid content). If the amount is too small in quantity, the strength of the coating layer and the water resistance will become insufficient, and if the amount is too large in quantity, the sensitivity will decrease.

The weight ratio of the carboxy-modified polyvinyl alcohol to the acrylic resin (carboxy-modified polyvinyl alcohol/acrylic resin) used in the present invention is preferably 80/20 to 20/80, more preferably 70/30 to 30/70, and more preferably 60/40 to 40/60.

Each amount of the epichlorohydrin resin and the modified polyamine/amide resin (excluding those contained in the epichlorohydrin resin) used in the present invention are preferably 1 to 100 parts by weight, more preferably 5 to 50 parts by weight each with respect to 100 parts by weight of the carboxy-modified polyvinyl alcohol.

If the amount is too small in quantity, the cross-linking reaction will be insufficient and good water resistance cannot be obtained, and if the amount is too large in quantity, the viscosity of the coating liquid will increase and problems occur in operability due to gelation.

The leuco dye, the color developing agent and other materials added when needed are finely ground into particles with several microns or smaller in size, using a grinder or a suitable emulsification device such as a ball mill, attritor, sand grinder and the like, and coating solutions are prepared by adding various additives depending on the objective. Water, alcohol and the like can be used as the solvent for preparing the coating solution and the solid content of the coating solution is usually about from 20 to 40 wt. %.

The above-mentioned binders, pigments, crosslinking agents, and other components may be used for each coating layer arbitrarily installed other than the thermosensitive recording layer, to the extent that these do not interfere with the desired performance.

The method for coating the thermosensitive recording layer and the other coating layer is not limited in particular, but any well-known conventional techniques may be used, such as curtain coating method, air knife coating method, bar blade coating method, rod blade coating method, bent blade coating method, bevel blade coating method, roll coating method, spray coating method and the like.

The coating amounts of the thermosensitive recording layer and the other coating layer are determined according to the required performance and printability and are not particularly restricted, but the typical dried coating amount of the thermosensitive recording layer is ordinarily in the range of from 2 to 12 g/m$^2$.

Furthermore, various technologies known in the thermosensitive recording medium field may be used as needed, for example, a flattening treatment such as super calendaring and the like may be conducted after coating each coating layer.

EXAMPLES

The following Examples illustrate the present invention, but the Examples are not intended to limit the scope of the present invention. "Part" and "%" refer to "weight part" and "weight %", respectively, unless otherwise specified.

Undercoat layer coating solution was prepared by dispersing and stirring the following formulation:

Undercoat Layer Coating Solution

| | |
|---|---|
| Calcined kaolin (BASF Co.: Ansilex 90) | 100.0 parts |
| Styrene-butadiene copolymer latex (Zeon Corporation, ST5526, solid content: 48%) | 10.0 parts |
| Water | 50.0 parts |

Color developing agent dispersion (Solution A), Leuco dye dispersion (Solution B) and Sensitizer dispersion (Solution C) with the following formulations were separately wet ground using sand grinders until the average particle sizes were about 0.5 μm.

Color Developing Agent Dispersion (Solution A)

| | |
|---|---|
| 4,4'-dihydroxy-diphenylsulfone (Nicca Chemical Co., Ltd., BPS-P) | 6.0 parts |
| Aqueous solution of completely saponified polyvinyl alcohol (Kuraray Co., Ltd., PVA117, solid content: 10%) | 5.0 parts |
| Water | 1.5 parts |

Leuco Dye Dispersion (Solution B)

| | |
|---|---|
| 3-Dibutylamino-6-methyl-7-anilinofluorane (Yamamoto Chemicals Inc., ODB-2) | 6.0 parts |
| Aqueous solution of completely saponified polyvinyl alcohol (PVA117) | 5.0 parts |
| Water | 1.5 parts |

Sensitizer Dispersion (Solution C)

| | |
|---|---|
| Diphenyl sulfone (Volant Chem Corp., DPS) | 6.0 parts |
| Aqueous solution of completely saponified polyvinyl alcohol (PVA117) | 5.0 parts |
| Water | 1.5 parts |

Next, these dispersions were blended in the proportions described below to prepare a thermosensitive recording layer coating solution.

Thermosensitive Recording Layer Coating Solution

| | |
|---|---|
| Color developing agent dispersion (Solution A) | 30.0 parts |
| Leuco dye dispersion (Solution B) | 15.0 parts |
| Sensitizer dispersion (Solution C) | 30.0 parts |
| Silica dispersion (Mizusawa Industrial Chemicals, Ltd., P527, solid content: 25%) | 40.0 parts |
| Carboxy-modified polyvinyl alcohol solution (Kuraray Co., Ltd.: KL318, solid content: 10%) | 20.0 parts |
| Acrylic resin (Aica Kogyo Co., Ltd., A25, solid content 48%, Tg 45 degree C., MFT 70 degree C.) | 4.0 parts |
| Modified polyamide resin (Sumitomo Chemical Co., Ltd.: Sumirez Resin SPI-106N, solid content 45%) | 1.25 parts |

-continued

| | |
|---|---|
| Polyamide epichlorohydrin resin (Seiko PMC Corporation, WS4030, solid content: 25%) | 2.5 parts |
| Zinc stearate dispersion (Chukyo Yushi Co., Ltd.: Hydrin Z-7-30, solid content: 30%) | 2.0 parts |

Example 1

The undercoat layer coating solution was applied on one side of a substrate (groundwood free paper with a basis weight of 47 g/m$^2$) by using a bent blade coater with a coating amount (in solid) of 10.0 g/m$^2$, and was dried to prepare an undercoated paper.

The thermosensitive recording layer coating solution was applied on the undercoat layer of the undercoated paper by using a rod blade coater with a coating amount (in solid) of 6.0 g/m$^2$ and was dried and super calendared so that the smoothness was 500-1,000 seconds to prepare a thermosensitive recording medium.

Example 2

A thermosensitive recording medium was prepared in the same manner as described in Example 1 using the thermosensitive recording layer coating solution with the exception of replacing the acrylic resin with 4.3 parts of an acrylic resin (Johnson Polymer Co., Ltd., A537, solid content 45%, Tg: 49 degree C., MFT: 42 degree C.).

Example 3

A thermosensitive recording medium was prepared in the same manner as described in Example 1 using the thermosensitive recording layer coating solution with the exception of changing the amount of the acrylic resin from 4.0 parts to 2.5 parts and the amount of the carboxy-modified polyvinyl alcohol solution from 20.0 parts to 40.0 parts.

Example 4

A thermosensitive recording medium was prepared in the same manner as described in Example 1 using the thermosensitive recording layer coating solution with the exception of changing the amount of the acrylic resin from 4.0 parts to 8.0 parts and the amount of the carboxy-modified polyvinyl alcohol solution from 20.0 parts to 10.0 parts.

Comparative Example 1

A thermosensitive recording medium was prepared in the same manner as described in Example 1 using the thermosensitive recording layer coating solution with the exception of not blending the acrylic resin (Aica Kogyo Co., Ltd., A25) and changing the amount of the carboxy-modified polyvinyl alcohol solution from 20.0 parts to 40.0 parts.

Comparative Example 2

A thermosensitive recording medium was prepared in the same manner as described in Example 1 using the thermosensitive recording layer coating solution with the exception of using 10.7 parts of acrylic resin (Mitsui Chemicals, Inc., B697, solid content 18%, Tg 45 degree C., MFT 20 degree C.) in place of 4.0 parts of the acrylic resin (Aica Kogyo Co., Ltd., A25).

Comparative Example 4

A thermosensitive recording medium was prepared in the same manner as described in Example 1 using the thermosensitive recording layer coating solution with the exception of not blending the carboxy-modified polyvinyl alcohol solution, the modified polyamide resin and the polyamide epichlorohydrin resin.

Comparative Example 5

A thermosensitive recording medium was prepared in the same manner as described in Example 1 using the thermosensitive recording layer coating solution with the exception of not blending the carboxy-modified polyvinyl alcohol solution.

Comparative Example 6

A thermosensitive recording medium was prepared in the same manner as described in Example 1 using the thermosensitive recording layer coating solution with the exception of not blending the carboxy-modified polyvinyl alcohol solution, the modified polyamide resin and the polyamide epichlorohydrin resin, and blending 1.5 parts of glyoxal (solid content: 40%).

Comparative Example 7

A thermosensitive recording medium was prepared in the same manner as described in Example 1 using the thermosensitive recording layer coating solution with the exception of not blending the modified polyamide resin and the polyamide epichlorohydrin resin, and blending 1.5 parts of glyoxal (solid content: 40%).

The prepared thermosensitive recording media were evaluated as below:

Color Developing Property (Recorded Density)

A checkerboard pattern was painted on the prepared thermosensitive recording media by using a thermosensitive recording medium print tester (Okura Engineering Co., Ltd. TH-PMD equipped with a thermal head by Kyocera Co.) at applied energy of 0.35 mJ/dot and 0.41 mJ/dot and printing speed of 50 mm/sec. The density of the printed portion was measured by using Macbeth Densitometer (RD-914, with Amber filter) to evaluate the color developing property (recorded density).

Plasticizer Resistance

Checkerboard pattern was printed on the prepared thermosensitive recording media by using a printing tester for thermosensitive recording paper (Okura Engineering Co. LTD., TH-PMD equipped with a thermal head manufactured by Kyocera Corporation.) at recording energy of 0.41 mJ/dot and recording speed of 50 mm/sec. A paper tube was wrapped once with polyvinyl chloride wrap (Mitsui Toatsu Chemical: High Wrap KMA) and the thermosensitive recording medium was placed on the wrapped paper tube so that the recorded face is the outer face. Furthermore, the tube was wrapped 3 times with polyvinyl chloride wrap and was left standing for 24 hours under the environmental condition of 23 degree C., 50% RH.

The record density of the recorded section was measured by using Macbeth densitometer (RD-914, with amber filter), and the residual ratio was calculated from the measured value (record density) before and after the treatment according to the following equation to evaluate the plasticizer resistance:

Residual ratio (%)=(record density after the treatment/record density before the treatment)×100

Water Resistance/Wet Friction

Tap water was put on a finger then the surface of the thermosensitive recording layer of the prepared thermosensitive recording medium was rubbed 80 times back and forth by the finger, and the peeling of the thermosensitive recording layer was visually evaluated according to the following criteria.

Good: No peeling observed on the thermosensitive recording layer

Fair: Slight peeling observed on the thermosensitive recording layer

Poor: Peeling observed on entire surface of the thermosensitive recording layer

Water Resistance/Water Blocking Resistance 10 ml of tap water was dropped on the surface of the thermosensitive recording layer of the prepared thermosensitive recording medium. Then the thermosensitive recording medium sample was folded so that the thermosensitive recording layer is inside and a load of 10 g/cm$^2$ is applied on the sample, which was left standing for 24 hours at 40 degree C. 90% RH. After placing, the sample was peeled off, and the peeling of the thermosensitive recording layer at the portion where water was dropped was visually evaluated according to the following criteria:

Good: No peeling observed on the thermosensitive recording layer

Fair: Slight peeling observed on the thermosensitive recording layer

Poor: Peeling observed on entire surface of the thermosensitive recording layer

Water Resistance/Immersion Friction

The prepared thermosensitive recording medium was immersed in tap water for three minutes, and the surface of the thermosensitive recording layer was rubbed 10 times back and forth by a finger, and the peeling of the thermosensitive recording layer was visually evaluated according to the following criteria.

Good: No peeling observed on the thermosensitive recording layer

Fair: Slight peeling observed on the thermosensitive recording layer

Poor: Peeling observed on entire surface of the thermosensitive recording layer

Surface Quality of the Thermosensitive Recording Layer

A solid pattern was painted on the coated surface of the prepared thermosensitive recording media by using a thermosensitive recording medium print tester (Okura Engineering Co., Ltd. TH-PMD equipped with a thermal head manufactured by Kyocera Co.). The printed surface quality (uniformity) was visually evaluated according to the following criteria.

Good: No unintended solid on the printed surface and the printed surface is uniform.

Fair: Slight unintended solid on the printed surface and the printed surface is almost uniform. No problem for practical use.

Poor: Unintended solid observed on the printed surface and the printed surface is not uniform.

Photographs of the printed surfaces of Example 1 and Comparative Example 3 are shown in FIG. 1 (A: Example 1, B: Comparative Example 3).

The evaluation results are shown in Table 1.

TABLE 1

| | | Tg(° C.) | MFT (° C.) | Example 1 | Example 2 | Example 3 | Example 4 | Comparative Example 1 | Comparative Example 2 |
|---|---|---|---|---|---|---|---|---|---|
| Amount in the thermosensitive recording layer (wt %) | Acrylic resin A25 | 45 | 70 | 3.5 | — | 2.1 | 6.7 | — | — |
| | Acrylic resin A537 | 49 | 42 | — | 3.4 | — | — | — | — |
| | Acrylic resin ASN1004K | 55 | 18 | — | — | — | — | — | 3.5 |
| | Acrylic resin B697B | 45 | 20 | — | — | — | — | — | — |
| | Carboxy-modified polyvinyl alcohol | | | 3.7 | 3.5 | 6.9 | 1.7 | 7.3 | 3.7 |
| | Modified polyamide resin | | | 1.0 | 1.0 | 1.0 | 1.0 | 1.0 | 1.0 |
| | Polyamide epichlorohydrin resin | | | 1.1 | 1.1 | 1.1 | 1.1 | 1.1 | 1.1 |
| | Glyoxal | | | — | — | — | — | — | — |
| Carboxy-modified polyvinyl alcohol/Acrylic resin (wt ratio) | | | | 51/49 | 51/49 | 77/23 | 21/79 | — | 51/49 |
| Color developing property (Recorded density) | 0.35mJ/dot | | | 1.35 | 1.27 | 1.32 | 1.37 | 1.33 | 1.24 |
| | 0.41mJ/dot | | | 1.42 | 1.34 | 1.38 | 1.43 | 1.39 | 1.27 |
| Plasticizer resistance | Residual ratio (%) | | | 93.7 | 80.1 | 97.8 | 89.5 | 79.3 | 53.2 |
| Water resistance | Wet friction | | | Good | Fair | Good | Good | Fair | Poor |
| | Water blocking resistance | | | Good | Good | Good | Good | Fair | Fair |
| | Immersion friction | | | Good | Fair | Good | Good | Poor | Poor |
| Surface quality of the thermosensitive recording layer | | | | Good | Fair | Good | Good | Good | Poor |

TABLE 1-continued

| | | Tg (° C.) | MFT (° C.) | Comparative Example 3 | Comparative Example 4 | Comparative Example 5 | Comparative Example 6 | Comparative Example 7 |
|---|---|---|---|---|---|---|---|---|
| Amount in the thermosensitive recording layer (wt %) | Acrylic resin A25 | 45 | 70 | — | 3.7 | 3.6 | 3.7 | 3.5 |
| | Acrylic resin A537 | 49 | 42 | — | — | — | — | — |
| | Acrylic resin ASN1004K | 55 | 18 | — | — | — | — | — |
| | Acrylic resin B697B | 45 | 20 | 3.5 | — | — | — | — |
| | Carboxy-modified polyvinyl alcohol | | | 3.7 | — | — | — | 3.7 |
| | Modified polyamide resin | | | 1.0 | — | 1.1 | — | — |
| | Polyamide epichlorohydrin resin | | | 1.1 | — | 1.2 | — | — |
| | Glyoxal | | | — | — | — | 4:48 | 2:24 |
| Carboxy-modified polyvinyl alcohol/Acrylic resin (wt ratio) | | | | 51/49 | — | — | — | 51/49 |
| Color developing property (Recorded density) | 0.35 mJ/dot | | | 1.23 | 1.37 | 1.28 | 1.36 | 1.33 |
| | 0.41 mJ/dot | | | 1.25 | 1.45 | 1.33 | 1.43 | 1.41 |
| Plasticizer resistance | Residual ratio (%) | | | 50.9 | 30.2 | 33.4 | 32 | 65.2 |
| Water resistance | Wet friction | | | Poor | Poor | Fair | Poor | Poor |
| | Water blocking resistance | | | Poor | Poor | Poor | Poor | Poor |
| | Immersion friction | | | Poor | Poor | Poor | Poor | Poor |
| Surface quality of the thermosensitive recording layer | | | | Poor | Good | Poor | Good | Good |

The thermosensitive recording media of Examples 1, 3 and 4 show excellent water resistance, and also show superior printed surface quality, where no unintended solid particles were found on the printed surface and the printed solid pattern on the surface was uniform. The thermosensitive recording medium of Example 2 was slightly inferior to Examples 1, 3 and 4 in both water resistance and surface qualities, but there was no problem in practical use. These results indicate that the thermosensitive recording media having the thermosensitive recording layer with the configuration of the present invention show the excellent performance.

On the other hand, the thermosensitive recording medium of Comparative Example 1 lacking the acrylic resin of the present invention in the thermosensitive recording layer was poor in the immersion friction of the water resistance, although the surface quality was excellent. Further, the thermosensitive recording media of Comparative Examples 2 and 3 using the acrylic resin with Tg and MFT different from those of the acrylic resin used in the thermosensitive recording layer of the present invention was poor in overall of the water resistance, and also poor in the surface quality, where unintended solid particles were found on the printed surface and unprinted area and uneven color development were observed in the solid printed surface.

Further, the thermosensitive recording media of Comparative Examples 4 to 7 lacking any or all of carboxy-modified polyvinyl alcohol, epichlorohydrin resin and modified polyamine/amide resin are poor in overall of water resistance and are poor in plasticizer resistance, and further poor in the surface quality, where unintended solid particles were found on the printed surface and unprinted area and uneven color development were observed in the solid printed surface.

What is claimed is:

1. A thermosensitive recording medium having a thermosensitive recording layer comprising a colorless or pale colored basic leuco dye and an electron accepting developing agent on a substrate, but not having a protective layer on the thermosensitive recording layer, wherein the thermosensitive recording layer further comprises (i) a carboxy-modified polyvinyl alcohol as a binder, (ii) an epichlorohydrin resin and a modified polyamine/amide resin excluding those contained in the epichlorohydrin resin as crosslinking agents, and (iii) an acrylic resin with a glass transition temperature (Tg) of lower than or equal to 50 degree C. and a minimum film forming temperature (MFT) of higher than or equal to 40 degree C.

2. The thermosensitive recording medium of claim 1, wherein the acrylic resin has a glass transition point (Tg) of 40 degree C. to 50 degree C.

3. The thermosensitive recording medium of claim 1, wherein the minimum film-forming temperature (MFT) of the acrylic resin is 60 degree C. to 80 degree C.

4. The thermosensitive recording medium of claim 1, wherein a content of methyl methacrylate (MMA) in the acrylic resin is 60% or more.

5. The thermosensitive recording medium of claim 1, wherein the acrylic resin does not contain styrene as a monomer.

6. The thermosensitive recording medium of claim 1, wherein the acrylic resin is a non-core shell type acrylic resin.

7. The thermosensitive recording medium of claim 1, wherein the weight ratio of the carboxy-modified polyvinyl alcohol to the acrylic resin is 80/20 to 20/80.

8. The thermosensitive recording medium of claim 2, wherein the minimum film-forming temperature (MFT) of the acrylic resin is 60 degree C. to 80 degree C.

9. The thermosensitive recording medium of claim 2, wherein a content of methyl methacrylate (MMA) in the acrylic resin is 60% or more.

10. The thermosensitive recording medium of claim 2, wherein the acrylic resin does not contain styrene as a monomer.

11. The thermosensitive recording medium of claim 2, wherein the acrylic resin is a non-core shell type acrylic resin.

12. The thermosensitive recording medium of claim 2, wherein the weight ratio of the carboxy-modified polyvinyl alcohol to the acrylic resin is 80/20 to 20/80.

13. The thermosensitive recording medium of claim 3, wherein a content of methyl methacrylate (MMA) in the acrylic resin is 60% or more.

14. The thermosensitive recording medium of claim 3, wherein the acrylic resin does not contain styrene as a monomer.

15. The thermosensitive recording medium of claim 3, wherein the acrylic resin is a non-core shell type acrylic resin.

16. The thermosensitive recording medium of claim 3, wherein the weight ratio of the carboxy-modified polyvinyl alcohol to the acrylic resin is 80/20 to 20/80.

17. The thermosensitive recording medium of claim 4, wherein the acrylic resin does not contain styrene as a monomer.

18. The thermosensitive recording medium of claim 4, wherein the acrylic resin is a non-core shell type acrylic resin.

19. The thermosensitive recording medium of claim 4, wherein the weight ratio of the carboxy-modified polyvinyl alcohol to the acrylic resin is 80/20 to 20/80.

* * * * *